(12) United States Patent
Pica et al.

(10) Patent No.: US 8,838,035 B2
(45) Date of Patent: Sep. 16, 2014

(54) APPARATUS AND METHOD TO CONTROL IDLE-MODE RADIO MEASUREMENTS

(75) Inventors: Francesco Pica, San Diego, CA (US); Udayan Murli Bhawnani, San Diego, CA (US); Aziz Gholmieh, San Diego, CA (US); Sharad Deepak Sambhwani, San Diego, CA (US); Etienne François Chaponniere, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 567 days.

(21) Appl. No.: 12/825,725

(22) Filed: Jun. 29, 2010

(65) Prior Publication Data

US 2011/0319032 A1 Dec. 29, 2011

(51) Int. Cl.
*H04B 17/00* (2006.01)
*H04W 24/10* (2009.01)
*H04W 48/20* (2009.01)

(52) U.S. Cl.
CPC .............. *H04W 24/10* (2013.01); *H04W 48/20* (2013.01); *H04B 17/0057* (2013.01)
USPC .................. 455/67.11; 455/436; 370/331

(58) Field of Classification Search
CPC ..... H04W 24/10; H04W 48/20; H04W 36/30; H04W 36/14; H04W 36/245; H04W 36/18; H04W 36/08; H04B 17/0077; H04B 17/0045; H04B 17/005; H04B 17/0057; H04B 17/006; H04L 12/5695; H04L 1/20; H04L 47/14; H04L 47/788; H04L 1/0026
USPC ........ 455/437, 438, 550.1, 436, 67.11, 67.13, 455/445, 11.1, 12.1, 277.1, 310, 343.2, 455/41.2, 414.4, 420, 423, 428, 432.1, 434, 455/435.1, 435.2, 439, 462, 513, 522, 455/562.1, 574, 63.1, 73; 370/252, 332, 370/229, 310, 437, 328, 331, 338, 350, 352, 370/410
See application file for complete search history.

(56) References Cited

U.S. PATENT DOCUMENTS

| | | | |
|---|---|---|---|
| 7,231,213 B2 * | 6/2007 | Dorsey et al. ................. | 455/445 |
| 2007/0135125 A1 * | 6/2007 | Kim et al. ..................... | 455/436 |
| 2008/0107019 A1 * | 5/2008 | Lee et al. ...................... | 370/229 |
| 2008/0220784 A1 * | 9/2008 | Somasundaram et al. .... | 455/437 |

(Continued)

FOREIGN PATENT DOCUMENTS

| | | | | |
|---|---|---|---|---|
| EP | 1919248 A2 | | 5/2008 | |
| WO | WO-2009041498 | * | 4/2009 | |
| WO | WO 2009041498 | * | 4/2009 | ............... H04Q 7/34 |

OTHER PUBLICATIONS

"3rd Generation Partnership Project; Technical Specification Group Radio Access Network; Evolved Universal Terrestrial Radio Access (E-UTRA); Physical layer; Measurements (Release 9 )", 3GPP Standard; 3GPP TS 36.214, 3rd Generation Partnership Project (3GPP), Mobile Competence Centre ; 650, Route Des Luci0les ; F-06921 Sophia-Antipolis Cedex ; France, No. V9.2.0, Jun. 14, 2010, pp. 1-14, XP050441717, [retrieved on Jun. 14, 2010].

(Continued)

*Primary Examiner* — Golam Sorowar
(74) *Attorney, Agent, or Firm* — Abdollah Katbab

(57) ABSTRACT

An apparatus and method for controlling idle mode radio measurements comprising: determining if a radio measurement is less than a radio threshold; determining a time duration in which the radio measurement is less than the radio threshold; determining if the time duration is greater than a time measurement threshold; and obtaining at least one other radio measurement from at least one base station which is not a serving cell.

27 Claims, 8 Drawing Sheets

(56) References Cited

U.S. PATENT DOCUMENTS

| | | | |
|---|---|---|---|
| 2009/0275335 A1* | 11/2009 | Jalloul et al. | 455/437 |
| 2010/0159843 A1* | 6/2010 | Ikeda et al. | 455/67.11 |
| 2010/0208707 A1* | 8/2010 | Hamabe et al. | 370/332 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 9 )", 3GPP Standard; 3GPP TS 36.304, 3rd Generation Partnership Project (3GPP), Mobile Competence Centre ; 650, Route Des Lucioles ; F-06921 Sophia-Antipolis Cedex ; France, No. V9.3.0, Jun. 15, 2010, pp. 1-32, XP050441766, [retrieved on Jun. 15, 2010]. International Search Report and Written Opinion—PCT/US2011/042461—ISA/EPO—Nov. 3, 2011.

* cited by examiner

APPARATUS AND METHOD TO CONTROL IDLE-MODE RADIO MEASUREMENTS

FIELD

This disclosure relates generally to apparatus and methods for wireless communication. In particular, the disclosure relates to controlling idle-mode radio measurements.

BACKGROUND

In many communication systems, communications networks are used to exchange messages among several interacting nodes which are separated apart in space. There are many types of networks which may be classified in different aspects. In one example, the geographic scope of the network could be over a wide area, a metropolitan area, a local area, or a personal area, and the corresponding networks are designated as wide area network (WAN), metropolitan area network (MAN), local area network (LAN), or personal area network (PAN). Networks may also differ in the switching/routing technique used to interconnect the various network nodes and devices (e.g. circuit switching, packet switching, etc.), in the type of physical media employed for waveform propagation (e.g. wired vs. wireless), or in the set of communication protocols used (e.g. Internet protocol suite, SONET (Synchronous Optical Networking), Ethernet, wireless LAN protocols, etc.).

One important characteristic of communications networks is the choice of wired or wireless media for the transmission of electrical signals among the network nodes. In the case of wired networks, tangible physical media such as copper wire, coaxial cable, fiber optic cable, etc. are employed to propagate guided electromagnetic waveforms which carry message traffic over a distance. Wired networks are a traditional form of communications networks and may be favored for interconnection of fixed network elements or for bulk data transfer. For example, fiber optic cables are often the preferred transmission media for very high throughput transport applications over long distances between large network hubs, for example, bulk data transport across or between continents over the Earth's surface.

On the other hand, in many cases, wireless networks are preferred when the network elements are mobile with dynamic connectivity or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks have the distinct advantage of facilitating user mobility and rapid field deployment compared to fixed wired networks. However, usage of wireless propagation requires significant active resource management among the network users and high levels of mutual coordination and cooperation for compatible spectrum utilization.

Wireless networks also require a mechanism to regulate user access to the shared radio spread spectrum. That is, wireless networks must utilize a multiple access protocol to arbitrate mutual access to the common radio spectrum. Types of multiple access protocols include frequency division multiple access (FDMA), time division multiple access (TDMA), code division multiple access (CDMA), orthogonal frequency division multiple access (OFDMA), space division multiple access (SDMA), etc. In addition to multiple access technique, wireless systems may be classified by the wireless protocol family used for user transmissions, network services, signaling, etc. For example, commonly used wireless protocols include Global System for Mobile Communications (GSM), cdmaONE (IS-95), cdma 2000-1x, cdma 2000 EV-DO (Evolution-Data Optimized), Universal Mobile Telecommunications System (UMTS), Long Term Evolution (LTE), etc. In particular, UMTS includes various operational modes including wideband code division multiple access (WCDMA) as an air interface and high speed packet access (HSPA) as an enhanced packet data service.

SUMMARY

Disclosed is an apparatus and method for controlling idle mode measurements. According to one aspect, a method for controlling idle mode radio measurements comprising determining if a radio measurement is less than a radio threshold; determining a time duration in which the radio measurement is less than the radio threshold; determining if the time duration is greater than a time measurement threshold; and obtaining at least one other radio measurement from at least one base station which is not a serving cell.

According to another aspect, an apparatus for controlling idle mode radio measurements comprising means for determining if a radio measurement is less than a radio threshold; means for determining a time duration in which the radio measurement is less than the radio threshold; means for determining if the time duration is greater than a time measurement threshold; and means for obtaining at least one other radio measurement from at least one base station which is not a serving cell.

According to another aspect, a user equipment comprising a processor and a memory, the memory containing program code executable by the processor for performing the following: determining if a radio measurement is less than a radio threshold; determining a time duration in which the radio measurement is less than the radio threshold; determining if the time duration is greater than a time measurement threshold; and obtaining at least one other radio measurement from at least one base station which is not a serving cell.

According to another aspect, a computer-readable medium storing a computer program, wherein execution of the computer program is for: determining if a radio measurement is less than a radio threshold; determining a time duration in which the radio measurement is less than the radio threshold; determining if the time duration is greater than a time measurement threshold; and obtaining at least one other radio measurement from at least one base station which is not a serving cell.

Advantages of the present disclosure may include improving the quality of RF radio measurements in idle mode by using a time measurement threshold, and thus prolonging UE battery life and improving user experience.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
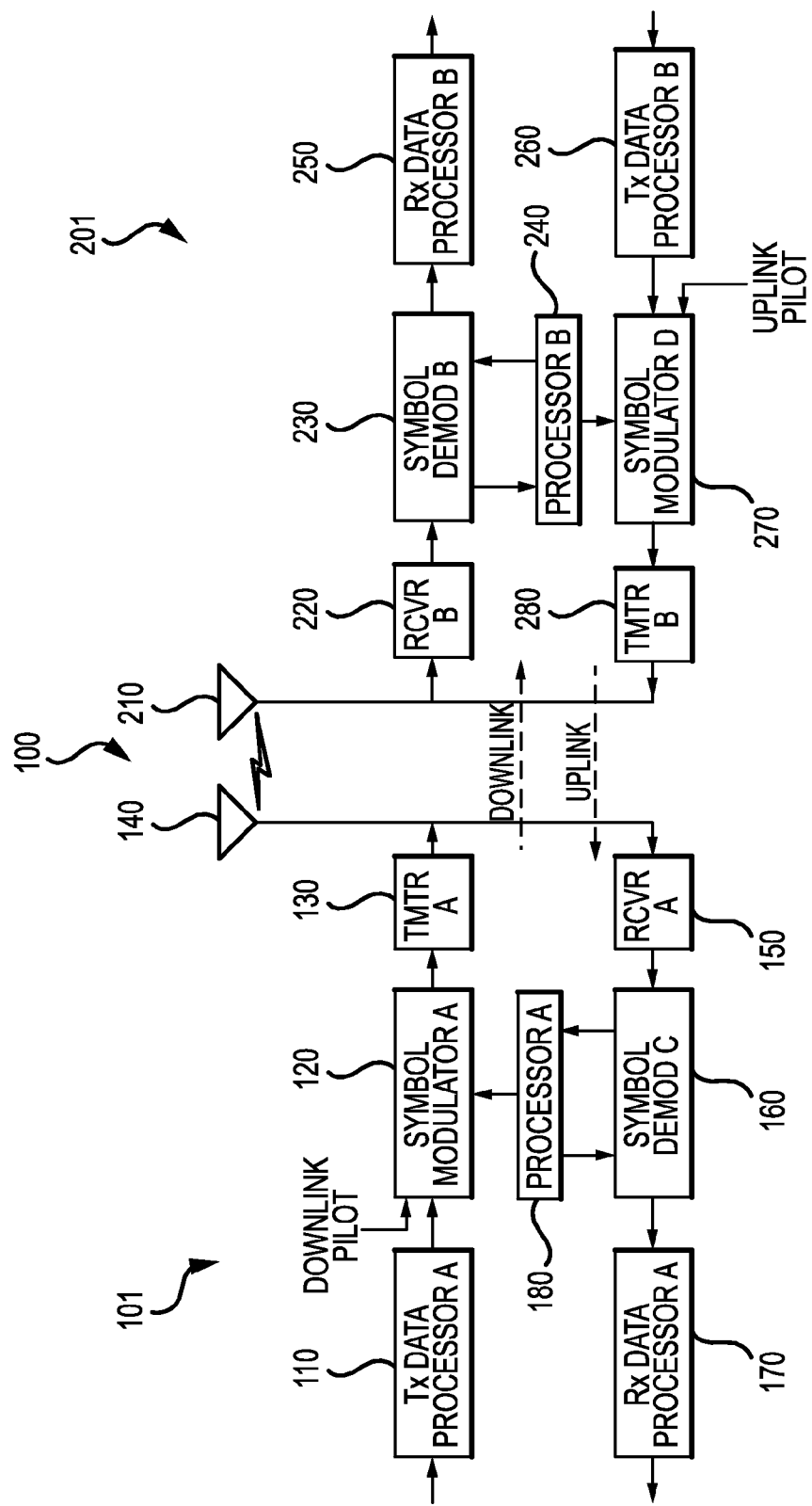
FIG. 1 illustrates an example block diagram of an access node/UE system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for UMTS and LTE, and UMTS/LTE terminology is used in much of the description below.

FIG. 1 illustrates an example block diagram of an access node/UE system 100. One skilled in the art would understand that the example access node/UE system 100 illustrated in FIG. 1 may be implemented in an FDMA environment, an OFDMA environment, a CDMA environment, a WCDMA environment, a TDMA environment, a SDMA environment or any other suitable wireless environment.

The access node/UE system 100 includes an access node 101 (e.g., base station) and a user equipment or UE 201 (e.g., wireless communication device). In the downlink leg, the access node 101 (e.g., base station) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
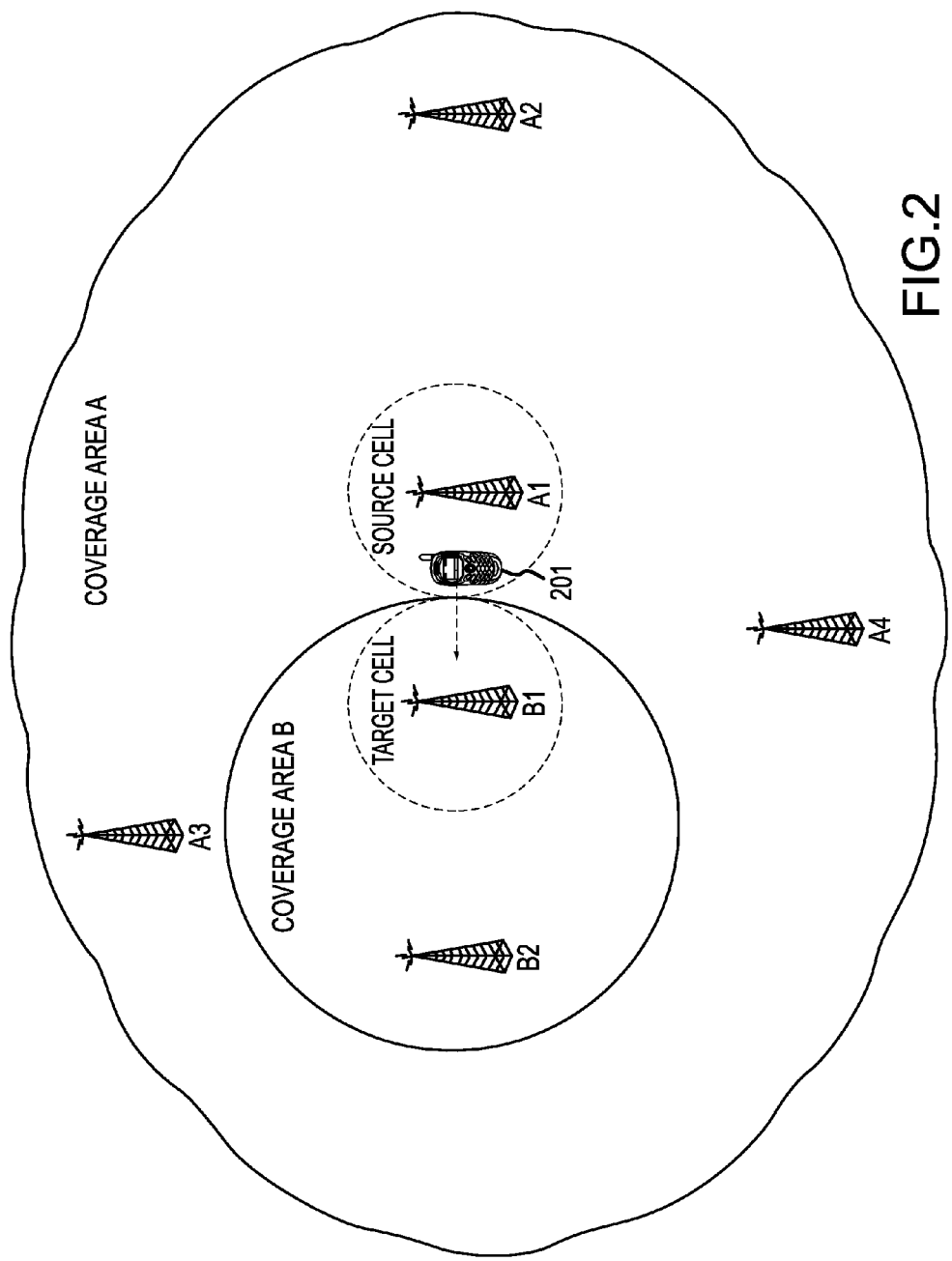
FIG. 2 illustrates an example of a user equipment (UE) within one coverage area A with access nodes $A_1, A_2, A_3, A_4$ and approaching the edge of another coverage area B with access nodes $B_1$ and $B_2$.

FIG. 2 illustrates an example of a user equipment (UE) within one coverage area A with access nodes $A_1, A_2, A_3, A_4$ and approaching the edge of another coverage area B with access nodes $B_1$ and $B_2$. As shown in FIG. 2, UE 201 is located within the source cell within coverage area A and approaching the target cell within coverage area B. Coverage area A employs radio access technology A while coverage area B employs radio access technology B. Wireless system A is associated with coverage area A, and wireless system B is associated with coverage area B. In one aspect, as the UE 201 approaches the target cell, a comparison is made to determine if the signal quality from the target cell (e.g., target cell signal quality) is higher than the signal quality from the source cell (e.g., source cell signal quality). If the signal quality from the target cell is higher, than a transition is made from the source cell to the target cell, i.e., an inter-radio access technology (IRAT) transition is triggered from the source cell to the target cell. In one aspect, the signal quality from the target cell must be higher than the signal quality from the source cell for a continuous X time interval before the transition is made. In one example, the X time interval is 5 seconds. One skilled in the art would understand that although the example given relates to inter-radio access technology (IRAT), the present disclosure is equally applicable to either intra-frequency or inter-frequency cases.

Transitioning the wireless access connection of the UE 201 between wireless systems A and B requires a finite amount of time to complete. For example, if the UE 201 starts in the source cell within coverage area A (e.g., a 2G coverage area employing 2G radio access technology by a 2G wireless system) and moves towards the target cell within coverage area B (e.g., a 3G coverage area employing 3G radio access technology by a 3G wireless system), the UE 201 may reselect to wireless system B (e.g., 3G wireless system) and start collecting system information from the access nodes within coverage area B. This process may not be completed for some time, e.g., several seconds such as 3-5 seconds for some systems. Meanwhile, wireless system A (e.g., 2G wireless system) may be sending a page to the UE 201 via the access node $A_1$ within the source cell within the coverage area A (e.g., the 2G coverage area). If the UE 201 has already reselected to wireless system B (e.g., 3G wireless system), it does not monitor the incoming page sent to wireless system A (e.g., 2G wireless system), resulting in an unsuccessful page and a poor experience for the UE user. The UE 201 does not start to monitor the paging channel in the target cell within coverage area B until the UE 201 has completed collecting all the essential system information from the target cell and until the UE 201 has performed mobility information update on the target cell and its associated radio access technology (RAT). In one aspect, the paging cycle is either 1.28 or 2.56 seconds which means that during this paging cycle (for example, of either 1.28 or 2.56 seconds), pages are missed by the UE 201. One skilled in the art would understand that the scope and spirit of the present disclosure are not affected by other examples of radio access technologies employed by other wireless systems, including but not limited to, UMTS, WCDMA, GSM, GSM/GPRS/EDGE, LTE, IS-95, CDMA2000, EVDO or UMB, etc.

The Third Generation Partnership Project (3GPP) is an international consortium responsible for the definition and maintenance of next generation wireless systems that evolve from the second generation GSM wireless system. In one aspect, 3GPP has defined the types of radio measurements a UMTS UE should perform in idle mode. For example, UMTS document TS 25.304 "User Equipment (UE) procedures in idle mode and procedures for cell reselection in connected mode" and LTE document TS 36.304 "Evolved Universal Terrestrial Radio Access (E-UTRA); User Equipment (UE) procedures in idle mode" specify various radio quality measurement requirements on the UE while in idle mode (i.e., not actively transmitting or receiving information). In one example, for UMTS the UE performs intra-frequency, inter-frequency, and inter-RAT (radio access technology) radio quality measurements (e.g., received signal code power (RSCP)) on the common pilot channel (CPICH) signal and compares the measurements to a configurable RSCP threshold. Alternatively, the radio quality measurements are compared to an energy to noise density ratio ($E/N_o$) threshold, for example, a chip energy to noise density ratio ($E_c/N_o$) threshold or a bit energy to noise density ratio ($E_b/N_o$) threshold. In another example for LTE, the UE performs radio quality measurements on a reference signal (RS) and compares them to a reference signal received power (RSRP) threshold or a reference signal received quality (RSRQ) threshold.

One issue with the current 3GPP specifications for idle mode measurements is that the defined procedures may lead to frequent and unnecessary UE measurements which cause further energy consumption and result in decreased battery life, thus adversely affecting user satisfaction. For example, in a dynamic wireless propagation environment where the RF power level varies considerably, following the 3GPP specifications for idle mode may result in power measurements taken more frequently than necessary. The present disclosure discloses adding a time measurement threshold to the idle mode measurement procedures.

In one aspect, the current 3GPP specifications on UE procedures in idle mode, TS 25.304 and TS 36.304, may be modified to add certain conditions to improve overall UE performance. For example, while operating within a given serving cell in the wireless network, the UE performs radio measurements on other cells if the serving cell quality is below a configurable quality threshold for a time duration exceeding a certain time measurement threshold, $T_{measurement}$ (e.g., seconds). If the serving cell quality is below a configurable quality threshold for a time duration less than the time measurement threshold $T_{measurement}$, then radio measurements on other cells are not performed. In one example, the serving cell quality and quality threshold are based on a received radio measurement (e.g., RSCP or RSRP) or on a received energy-to-noise density level (e.g., $E_b/N_0$, $E_c/N_0$, etc.) or on a received quality (e.g., reference signal received quality, RSRQ).

In one example, the time measurement threshold $T_{measurement}$ is a broadcast Radio Resource Control (RRC) parameter. In one aspect, RRC is part of the UMTS protocol stack and is responsible for control plane signaling between the UEs and the network infrastructure. One skilled in the art would understand that the value of the time measurement threshold $T_{measurement}$ may depend on different factors, such as but not limited to, particular application and design parameters, user choice, etc. without affecting the scope or spirit of the present disclosure.

In another example, there may be several implementations of the usage of the time measurement threshold ($T_{measurement}$), for example, in a 3GPP wireless network. For example, there could be different time measurement threshold ($T_{measurement}$) for different types of radio measurements (intra-frequency, inter-frequency, and inter-RAT). Alternatively, the same time measurement threshold ($T_{measurement}$) may be used for all radio measurements.

In one example, a scaling factor K for the time measurement threshold ($T_{measurement}$) may be broadcasted and applied for high mobility UE scenarios. For example, a modified time measurement threshold defined by $T_{modified}=KT_{measurement}$, where K is a scaling factor, may be used when the UE speed v exceeds a speed threshold $v_T$ which defines a high mobility regime. One skilled in the art would understand that the value of the scaling factor K and/or the value of the speed threshold $v_T$ may depend on different factors, such as but not limited to, particular application and design parameters, user choice, etc. without affecting the scope or spirit of the present disclosure. Additionally, different scaling factor may be used depending on the type of radio measurement (e.g., intra-frequency, inter-frequency, inter-radio access technology (IRAT), etc.)

Figure 3:
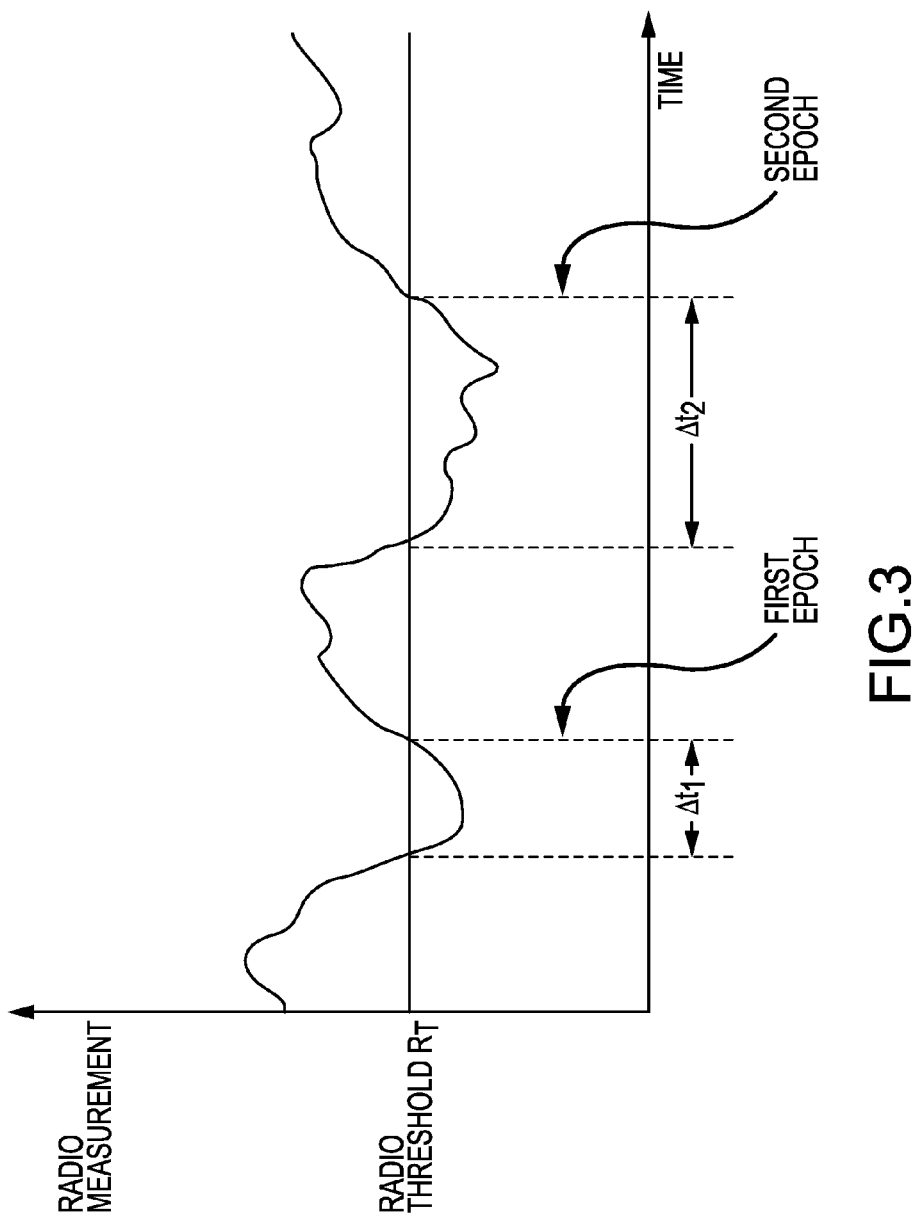
FIG. 3 illustrates an example application of a configurable time measurement threshold for idle mode radio measurements.

FIG. 3 illustrates an example application of a configurable time measurement threshold for idle mode radio measurements. Shown is a graph of radio measurements versus time as well as a predefined radio threshold $R_T$. The radio measurements first drop below the predefined radio threshold $R_T$ during a first epoch for a first time duration of $\Delta t_1$ seconds. At a later time, the radio measurements next drop below the predefined radio threshold $R_T$ during a second epoch for a second time duration of $\Delta t_2$ seconds. In one example, if the first time duration $\Delta t_1$ is less than the time measurement threshold $T_{measurement}$ then no radio measurements on other cells would be performed. However, if the second time duration $\Delta t_2$ is greater than the time measurement threshold $T_{measurement}$, the UE would perform radio measurements on other cells as a result of the radio measurements dropping below the predefined radio threshold $R_T$ during the second epoch.

The example presented in FIG. 3 may be extended to the case where different time measurement thresholds are defined for different types of radio measurements (e.g. intra-frequency, inter-frequency, inter-RAT, etc.). In this case, some of the rules for performing each radio measurement may be governed by the relationship between the radio measurements and the different time measurement thresholds. In one example, the radio measurement is a power measurement and the radio threshold $R_T$ is a power threshold $P_T$.

Figure 4:
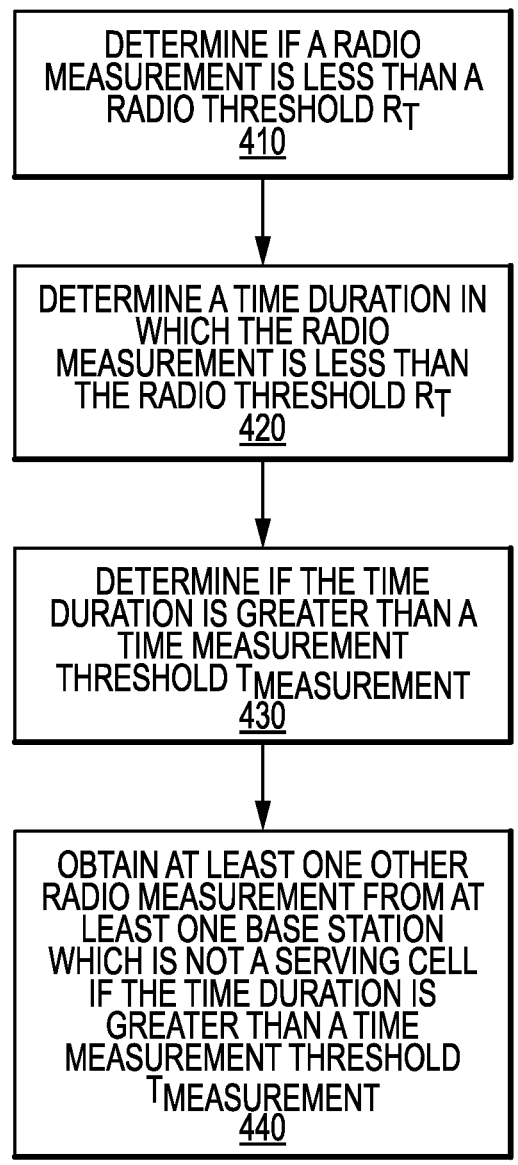
FIG. 4 illustrates a first example of a flow diagram for controlling idle mode radio measurements.

FIG. 4 illustrates a first example of a flow diagram for controlling idle mode radio measurements. In block 410, determine if a radio measurement is less than a radio threshold $R_T$. If the radio measurement is less than the radio threshold $R_T$, proceed to block 420. In block 420, determine a time duration in which the radio measurement is less than the radio threshold $R_T$. In block 430, determine if the time duration is greater than a time measurement threshold $T_{measurement}$. If yes, proceed to block 440 and obtain at least one other radio measurement from at least one base station which is not a serving cell. In one aspect, the time measurement threshold $T_{measurement}$ is configurable.

Figure 5:
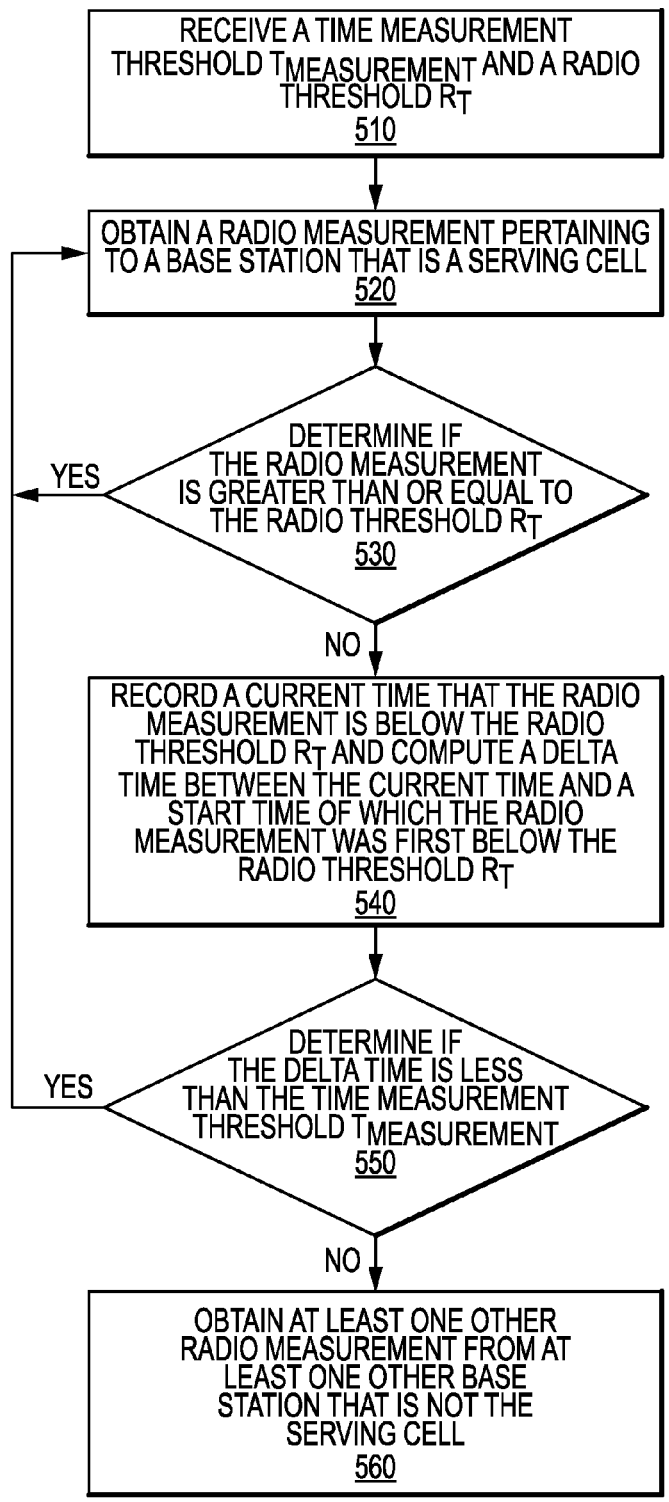
FIG. 5 illustrates a second example of a flow diagram for controlling idle mode radio measurements.

FIG. 5 illustrates a second example of a flow diagram for controlling idle mode radio measurements. In block 510, receive a time measurement threshold $T_{measurement}$ and a radio threshold $R_T$. In one example, the time measurement threshold $T_{measurement}$ and the radio threshold $R_T$ are received by a UE and broadcasted by a base station (e.g. eNodeB). In one example, the base station is the serving cell to the UE. In block 520, obtain a radio measurement. In one example, the radio measurement pertains to the base station (e.g., eNodeB). In block 530, determine if the radio measurement is greater than or equal to the radio threshold $R_T$. If the radio measurement is greater than or equal to the radio threshold $R_T$, then return to block 520 to obtain a new radio measurement. If the radio measurement is less than the radio threshold $R_T$, proceed to block 540. In block 540, record a current time that the radio measurement is below the radio threshold $R_T$ and compute a delta time (i.e., time duration) between the current time and a start time of which the radio measurement was first below the radio threshold $R_T$. In block 550, determine if the delta time is less than the time measurement threshold $T_{Measurement}$. If the delta time is less than the time measurement threshold $T_{Measurement}$, then return to block 520 to obtain another new radio measurement. If the delta time is greater than or equal to the time measurement threshold $T_{Measurement}$, then proceed to block 560. In block 560, obtain at least one other radio measurement from at least one other base station. The one other base station is different from the base station that is the serving cell. In one aspect, the time measurement threshold $T_{measurement}$ is configurable. In one example, the process described in the example flow diagram of FIG. 5 is repeated with one or more new radio measurements.

One skilled in the art would understand that the steps disclosed in the example flow diagrams in FIGS. 4 and 5 may be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 6:
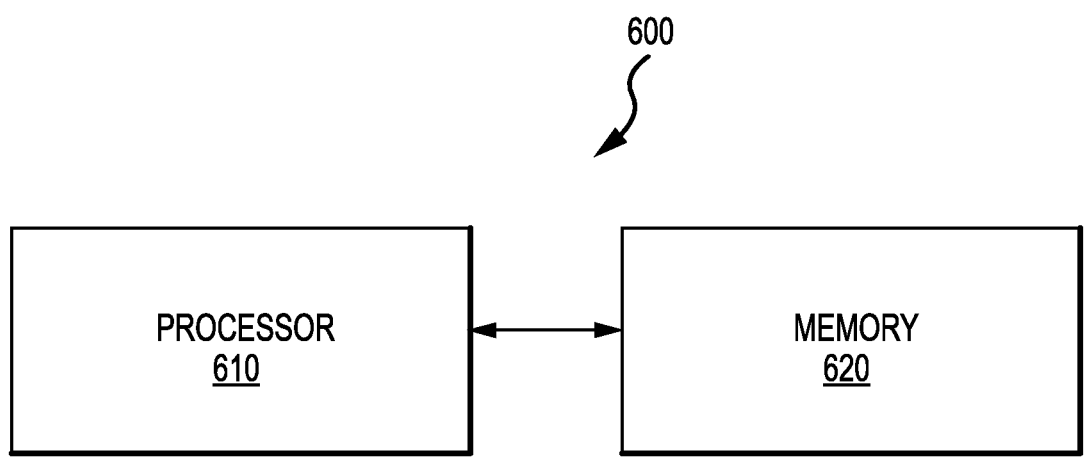
FIG. 6 illustrates an example of a device comprising a processor in communication with a memory for controlling idle mode radio measurements.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 6 illustrates an example of a device 600 comprising a processor 610 in communication with a memory 620 for controlling idle mode radio measurements. In one example, the device 600 is used to implement the algorithm illustrated in FIG. 4. In another example, the device 600 is used to implement the algorithm illustrated in FIG. 5. In one aspect, the memory 620 is located within the processor 610. In another aspect, the memory 620 is external to the processor 610. In one aspect, the processor includes circuitry for implementing or performing the various flow diagrams, logical blocks and/or modules described herein.

Figure 7:
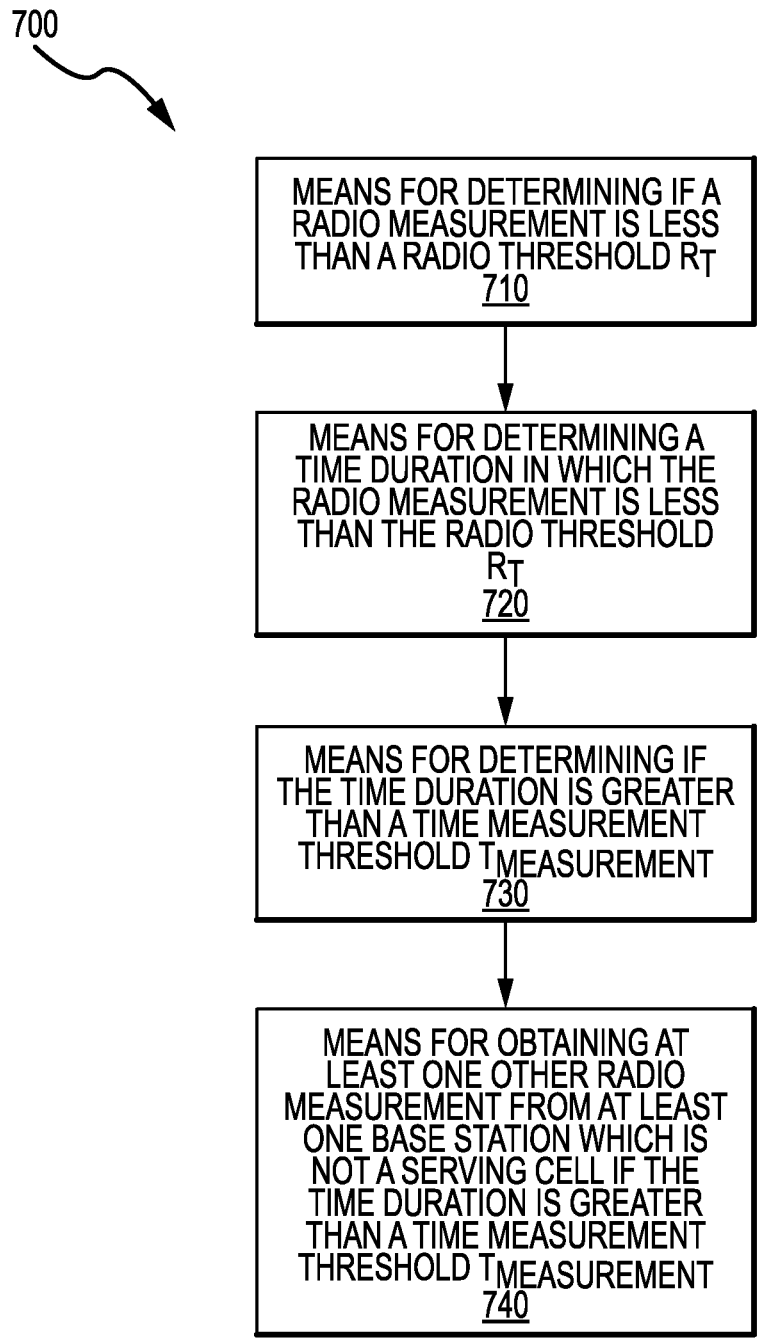
FIG. 7 illustrates a first example of a device suitable for controlling idle mode radio measurements.

FIG. 7 illustrates a first example of a device 700 suitable for controlling idle mode radio measurements. In one aspect, the device 700 is implemented by at least one processor comprising one or more modules configured to provide different aspects of controlling idle mode radio measurements as described herein in blocks 710, 720, 730 and 740. For example, each module comprises hardware, firmware, software, or any combination thereof. In one aspect, the device 700 is also implemented by at least one memory in communication with the at least one processor.

Figure 8:
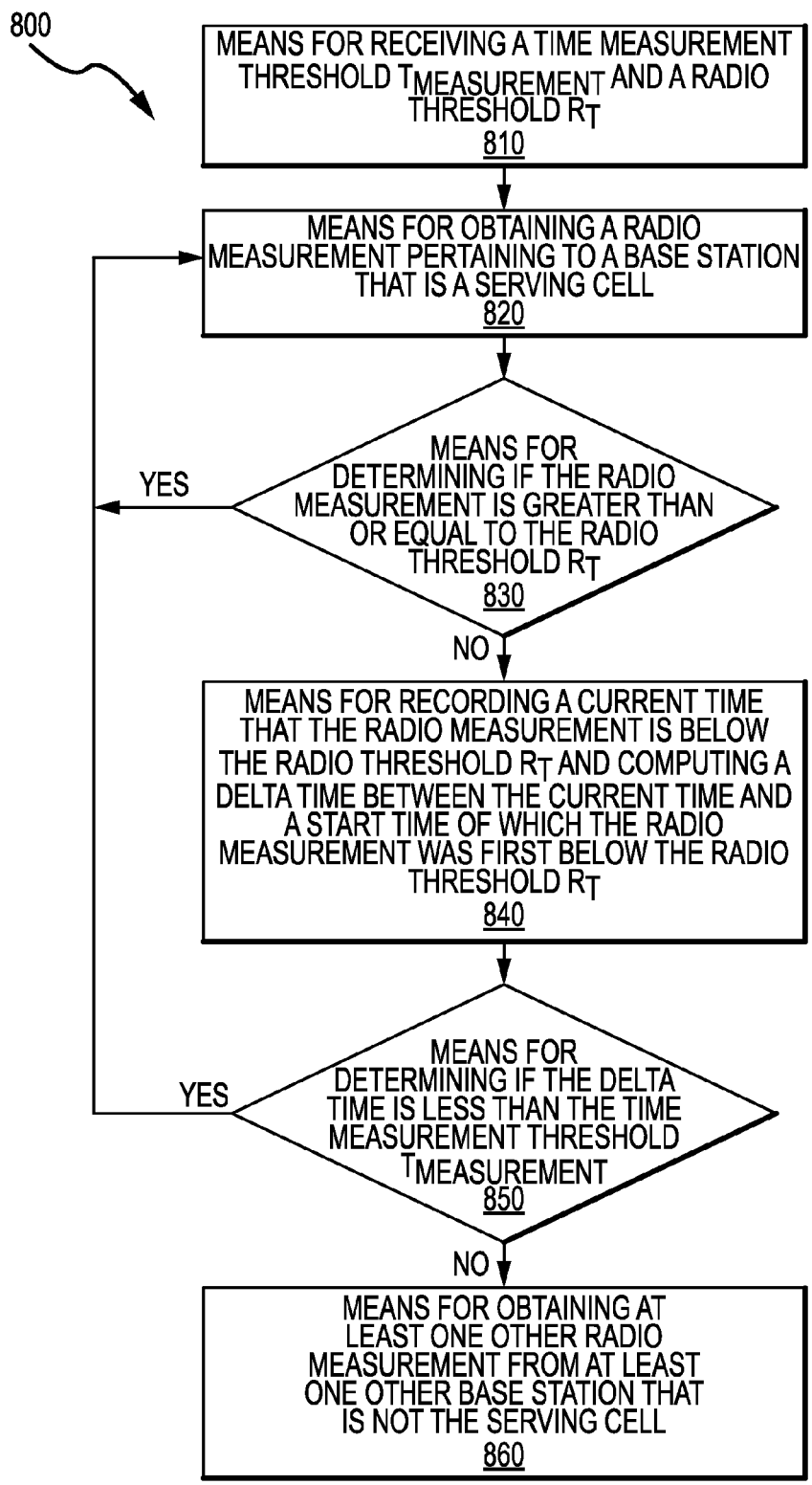
FIG. 8 illustrates a second example of a device suitable for controlling idle mode radio measurements.

FIG. 8 illustrates a second example of a device 800 suitable for controlling idle mode radio measurements. In one aspect, the device 800 is implemented by at least one processor comprising one or more modules configured to provide different aspects of controlling idle mode radio measurements as described herein in blocks 810, 820, 830, 840, 850 and 860. For example, each module comprises hardware, firmware, software, or any combination thereof. In one aspect, the device 800 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for controlling idle mode radio measurements comprising:
receiving a broadcast from a base station that is a serving cell, the broadcast comprising one or more time measurement thresholds, each of the time measurement thresholds being a Radio Resource Control (RRC) parameter, a first of the one or more time measurement thresholds defined for a first type of radio measurement, and a second of the one or more time measurement thresholds defined for a second type of radio measurement, the first type of radio measurement being different from the second type of radio measurement;
determining if a radio measurement is less than a radio threshold;
determining a time duration in which the radio measurement is less than the radio threshold;
determining if the time duration is greater than the one or more time measurement threshold, the one or more time measurement threshold comprising a predetermined length of time; and
upon determining that the time duration is greater than the one or more time measurement threshold, obtaining at least one other radio measurement from at least one base station that is a neighbor cell.

2. The method of claim 1 wherein the determining if the radio measurement is less than the radio threshold is based on the radio measurement being measured from the base station that is the serving cell.

3. The method of claim 2 further comprising obtaining the radio measurement on a common pilot channel (CPICH) signal wherein the radio measurement is a received signal code power (RSCP) or an energy to noise density ratio (E/No), and the radio threshold is a RSCP threshold or an energy to noise density ratio (E/No) threshold.

4. The method of claim 2 further comprising obtaining the radio measurement on a reference signal (RS) wherein the radio threshold is either a reference signal received power (RSRP) threshold or a reference signal received quality (RSRQ) threshold.

5. The method of claim 1 further comprising recording a current time wherein the radio measurement is below the radio threshold and computing the time duration between the current time and a start time of which the radio measurement was first below the radio threshold.

6. The method of claim 5 further comprising receiving the radio threshold broadcast from the base station which is the serving cell.

7. The method of claim 1 wherein the radio measurement is one of the following:
an intra-frequency measurement, an inter-frequency measure or an inter radio access technology (RAT) measurement.

8. The method of claim 7 further comprising applying a scaling factor to the one or more time measurement threshold.

9. A method for controlling idle mode radio measurements comprising:
means for receiving a broadcast from a base station that is a serving cell, the broadcast comprising one or more time measurement thresholds, each of the time measurement thresholds being a Radio Resource Control (RRC) parameter, a first of the one or more time measurement thresholds defined for a first type of radio measurement, and a second of the one or more time measurement thresholds defined for a second type of radio measurement, the first type of radio measurement being different from the second type of radio measurement;
means for determining if a radio measurement is less than a radio threshold;
means for determining a time duration in which the radio measurement is less than the radio threshold;
means for determining if the time duration is greater than the one or more time measurement threshold, the one or more time measurement threshold comprising a predetermined length of time; and
upon determining that the time duration is greater than the one or more time measurement threshold, means for obtaining at least one other radio measurement from at least one base station that is a neighbor cell.

10. The apparatus of claim 9, wherein the one or more time measurement threshold is configurable.

11. The apparatus of claim 9 wherein the means for determining if the radio measurement is less than the radio threshold is based on the radio measurement being measured from the base station that is the serving cell.

12. The apparatus of claim 11 further comprising means for obtaining the radio measurement on a common pilot channel (CPICH) signal wherein the radio measurement is a received signal code power (RSCP) or an energy to noise density ratio (E/No), and the radio threshold is a RSCP threshold or an energy to noise density ratio (E/No) threshold.

13. The apparatus of claim 11 further comprising means for obtaining the radio measurement on a reference signal (RS) wherein the radio threshold is either a reference signal received power (RSRP) threshold or a reference signal received quality (RSRQ) threshold.

14. The apparatus of claim 9 further comprising means for recording a current time wherein the radio measurement is below the radio threshold and means for computing the time duration between the current time and a start time of which the radio measurement was first below the radio threshold.

15. The apparatus of claim 14 further comprising means for receiving the radio threshold broadcast from the base station which is the serving cell.

16. The apparatus of claim 9 wherein the radio measurement is one of the following:
an intra-frequency measurement, an inter-frequency measure or an inter radio access technology (RAT) measurement.

17. The method of claim 16 further comprising means for applying a scaling factor to the one or more time measurement threshold.

18. At least one processor for controlling idle mode radio measurements, the processor configured to execute instructions to:

receive a broadcast from a base station that is a serving cell, the broadcast comprising one or more time measurement thresholds, each of the time measurement thresholds being a Radio Resource Control (RRC) parameter, a first of the one or more time measurement thresholds defined for a first type of radio measurement, and a second of the one or more time measurement thresholds defined for a second type of radio measurement, the first type of radio measurement being different from the second type of radio measurement;

determine if a radio measurement is less than a radio threshold;

determine a time duration in which the radio measurement is less than the radio threshold;

determining if the time duration is greater than the one or more time measurement threshold, the one or more time measurement threshold comprising a predetermined length of time; and upon determining that the time duration is greater than the one or more time measurement threshold, obtaining at least one other radio measurement from at least one base station that is a neighbor cell.

19. The processor of claim 18 wherein the one or more time measurement threshold is configurable.

20. The processor of claim 19 wherein the instructions are further executable by the processor to determine if the radio measurement is less than the radio threshold is based on the radio measurement being measured from the base station that is the serving cell.

21. The processor of claim 18 wherein the instructions are further executable by the processor to record a current time wherein the radio measurement is below the radio threshold and compute the time duration between the current time and a start time of which the radio measurement was first below the radio threshold.

22. The processor of claim 21 wherein the instructions are further executable by the processor to receive the radio threshold broadcast from the base station which is the serving cell.

23. The processor of claim 18 wherein the instructions are further executable by the processor to apply a scaling factor to the one or more time measurement threshold.

24. A computer program product for controlling idle mode radio measurement, comprising a non-transitory computer-readable medium comprising:

a first set of codes for receiving a broadcast from a base station that is a serving cell, the broadcast comprising one or more time measurement thresholds, each of the time measurement thresholds being a Radio Resource Control (RRC) parameter, a first of the one or more time measurement thresholds defined for a first type of radio measurement, and a second of the one or more time measurement thresholds defined for a second type of radio measurement, the first type of radio measurement being different from the second type of radio measurement;

a second set of codes for causing a computer to determine if a radio measurement is less than a radio threshold;

a third set of codes for causing a computer to determine a time duration in which the radio measurement is less than the radio threshold;

a fourth set of codes for causing a computer to determine if the one or more time duration is greater than a time measurement threshold, the one or more time measurement threshold comprising a predetermined length of time; and upon determining that the time duration is greater than the one or more time measurement threshold, a fifth set of codes for causing a computer to obtain at least one other radio measurement from at least one base station that is a neighbor cell.

25. The computer-readable medium of claim 24, further comprising codes for causing the computer to receive the radio threshold broadcast from the base station which is the serving cell and to obtain the radio measurement pertaining to the base station.

26. The computer-readable medium of claim 24, further comprising codes for causing the computer to record a current time wherein the radio measurement is below the radio threshold and to compute the time duration between the current time and a start time of which the radio measurement was first below the radio threshold.

27. The computer-readable medium for claim 24, further comprising codes for causing the computer to apply a scaling factor to the one or more time measurement threshold.

* * * * *